(12) United States Patent
Winters et al.

(10) Patent No.: US 7,844,240 B1
(45) Date of Patent: *Nov. 30, 2010

(54) METHOD OF SELECTING RECEIVE ANTENNAS FOR MIMO SYSTEMS

(75) Inventors: Jack Harriman Winters, Middletown, NJ (US); Yang-Seok Choi, Liberty Lake, WA (US); Byoung-Jo J Kim, Morganville, NJ (US); Andreas Molisch, North Plainfield, NJ (US); Moe Z. Win, Cambridge, MA (US); Hui Luo, Marlboro, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 635 days.

This patent is subject to a terminal disclaimer.

(21) Appl. No.: 11/897,312

(22) Filed: Aug. 30, 2007

Related U.S. Application Data

(63) Continuation of application No. 11/321,785, filed on Dec. 29, 2005, now Pat. No. 7,283,798, which is a continuation of application No. 10/324,168, filed on Dec. 19, 2002, now Pat. No. 7,006,810.

(51) Int. Cl.
*H04B 1/06* (2006.01)
*H04B 7/00* (2006.01)

(52) U.S. Cl. .............. 455/277.1; 455/562.1; 455/273; 375/254

(58) Field of Classification Search .............. 455/277.1, 455/277.2, 562.1, 561, 276.1, 273; 375/254, 375/267, 347
See application file for complete search history.

(56) References Cited

U.S. PATENT DOCUMENTS 7,006,810 B1 * 2/2006 Winters et al. ........... 455/277.1
7,283,798 B1 * 10/2007 Winters et al. ........... 455/277.1

\* cited by examiner

*Primary Examiner*—Edward Urban
*Assistant Examiner*—Christian A Hannon

(57) ABSTRACT

A method of performing receive antenna selection is presented. The method executes a determination operation for a set of receive antennas, determines a maximum result of the determination operation for two of the antennas, eliminates one of the two antennas from the set of antennas, and repeats the determination and elimination process until only a predetermined number of antennas remain in the set. The signals from these remaining antennas are then processed. The present invention reduces receiver complexity and cost.

23 Claims, 4 Drawing Sheets

METHOD OF SELECTING RECEIVE ANTENNAS FOR MIMO SYSTEMS

This application is a continuation of prior application Ser. No. 11/321,785 filed Dec. 29, 2005 now U.S. Pat. No. 7,283,798, which is a continuation of prior U.S. patent application Ser. No. 10/324,168 filed Dec. 19, 2002 now issued as U.S. Pat. No. 7,006,810, both of which are incorporated herein by reference.

CROSS REFERENCE TO RELATED APPLICATIONS

Not Applicable.

STATEMENT REGARDING FEDERALLY SPONSORED RESEARCH

Not applicable.

FIELD OF THE INVENTION

The present invention relates generally to systems having a plurality of receive antennas and, more particularly, to selecting a number of receive antennas from the plurality of receive antennas and processing signals from the selected antennas.

BACKGROUND OF THE INVENTION

Multiple Input Multiple Output (MIMO) systems are known to those of ordinary skill in the art. In a MIMO system, a stream of bits is demultiplexed into a predetermined number of substreams. Each substream is sent out over a different antenna. The signals get mixed through the wireless channel. Signal processing is applied to the signals at the set of receive antennas to unscramble the data. The unscrambled data streams are multiplexed into the original high rate bit stream. In such systems, only a portion (e.g. if three substreams were used, only one third) of the spectrum which would normally have been required is actually used.

Orthogonal Frequency Division Multiplexing (OFDM) is known to those of ordinary skill in the art. OFDM is a modulation technique useful for transmitting large amounts of data over a radio wave. The OFDM technique modulates multiple carriers at different frequencies with the same symbol rate such that the signals can be recovered without mutual interference. The receiver acquires the signal, digitizes the acquired signal, and performs a Fast Fourier Transform (FFT) on the digitized signal to get back to the frequency domain. The modulation is then recovered on each carrier. This technique results in a large amount of data being transmitted in a relatively small bandwidth.

The MIMO systems provide high spectral efficiency. Multiple transmit multiple receive antenna links increase the capacity of MIMO and MIMO OFDM systems. However, the implementation of high spectral efficiency is difficult due to the complexity of the systems and the resultant high costs.

It would, therefore, be desirable to provide a method of selecting receive antennas for MIMO and MIMO OFDM systems which reduces the cost and complexity of the MIMO and MIMO OFDM receivers.

SUMMARY OF THE INVENTION

In accordance with the present invention, a method of performing receive antenna selection is presented. The method executes a determination operation for a set of receive antennas, determines a maximum result of the determination operation for two of the antennas, eliminates one of the two antennas from the set of antennas, and repeats the determination and elimination process until only a predetermined number of antennas remain in the set. The signals from these remaining antennas are then processed.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
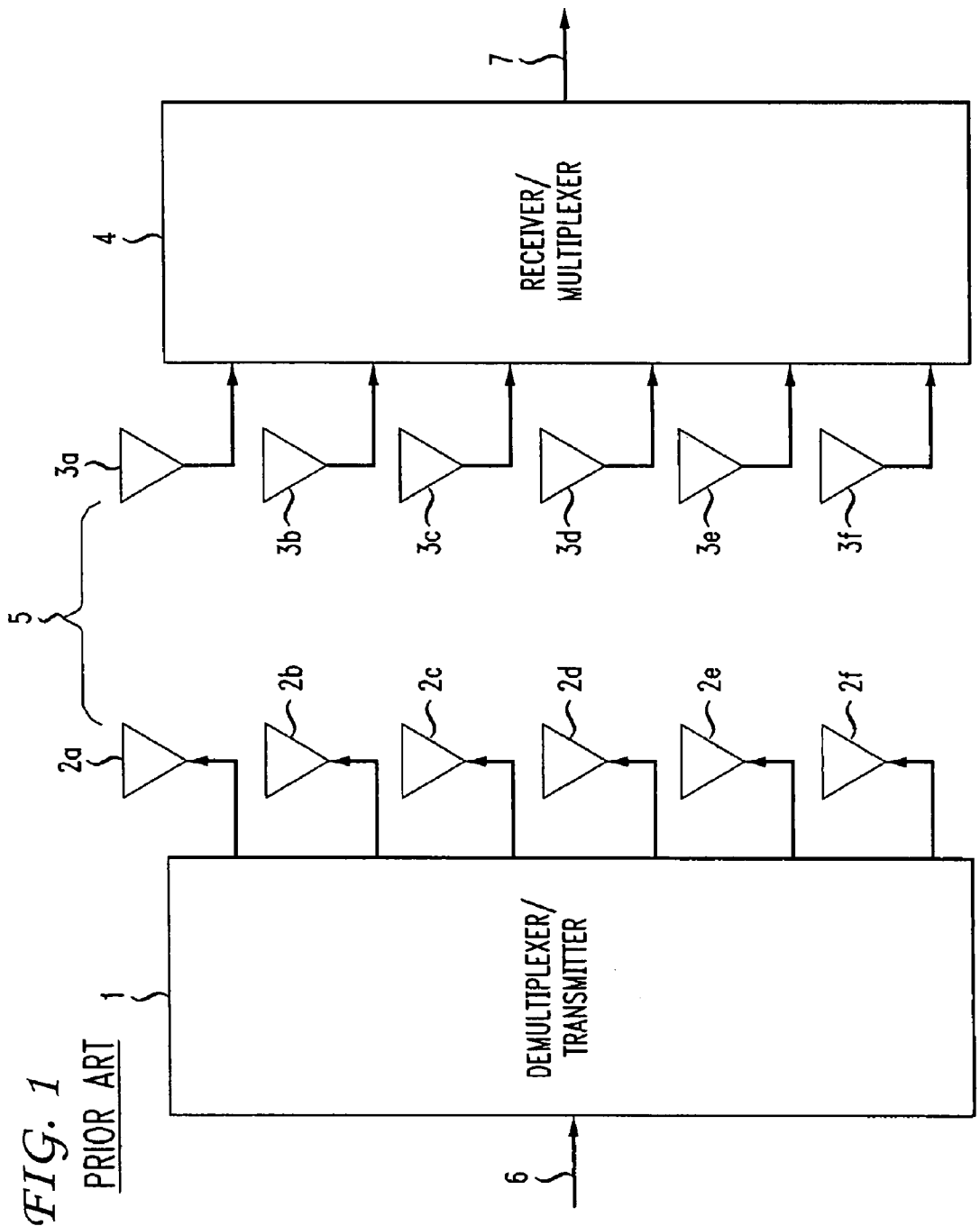
FIG. 1 is a block diagram of a portion of a MIMO/MIMO OFDM system.

Referring to FIG. 1, a prior art MIMO/MIMO OFDM system is shown. In the MIMO/MIMO OFDM system, a stream of bits 6 is demultiplexed by demultiplexer/transmitter 1 into a predetermined number of substreams. Each substream is sent out over a different transmit antenna $2a$-$2f$ by demultiplexer transmitter 1. The signals transmitted by the transmit antennas $2a$-$2f$ get mixed while traveling through the wireless channel 5. The signals are received by receive antennas $3a$-$3f$. The received signals are coupled from the receive antennas $3a$-$3f$ to receiver/multiplexer 4. Signal processing is applied to the signals at the set of receive antennas to unscramble the data. The unscrambled data streams are then demultiplexed into a high rate bit stream 7, which to is a copy of the high rate bit stream 6.

As described above, MIMO and MIMO OFDM systems require relatively complex and expensive receivers. A method is presented by which performing receive antenna selection is provided, thereby reducing the complexity and cost of the receiver in MIMO and MIMO OFDM systems.

It is known that the incremental gain of additional receive antennas in MIMO and MIMO ODFM systems is negligible when the number of receive antennas K is larger than the number of transmit antennas M. Hence, through receive antenna selection the reduced receiver complexity is possible without significant loss in the capacity of the system. There are several selection methods based on the capacity or the signal-to-interference and noise power ratio (SINR). These approaches require $$\binom{K}{S}$$

computations of their own criteria, i.e., the capacity or the SINR, where K is the number of receive antennas and S represents the number of selected antennas.

A MIMO system with K receive antennas and M transmit antennas will be used to describe the present invention. In slowly time-varying flat fading channel (also known as a Rayleigh fading channel) the received vector can be modeled as:

$$y = x + w = Hs + w \qquad \text{Equation (1)}$$

where y is the received vector with size K×1, x is the data component of y, K by M matrix H represents the channel, M×1 vector s is the transmitted vector with an identity correlation matrix and w is the noise vector.

Each element in channel matrix H is an independent complex Gaussian random variable with a variance equal to unity. The transmitted vector s is normalized such that $Tr\{ss^H\}=P$ where $s^H$ is the hermitian transpose of vector s, and P is the total transmitted power. The entries of w are independent and identically distributed and are defined by $w(i) \sim N(0, \sigma^2)$ where N indicates normal distribution and $\sigma^2$ is the noise power). The entries are independent over time and i.

S receive antennas are selected out of K antennas according to several criteria. By checking the capacity, S receive antennas are chosen out of K antennas in a way that the capacity is maximized. Alternatively, by examining the SINR, which is directly related to bit or symbol error rate, the selection of S receive antennas out of K antennas can also be performed.

In one embodiment, the receiver selects S antennas that allow a maximization of the capacity $$C_s = \max_{S(\tilde{H})} \log_2 \left| I_s + \frac{\rho}{M} \tilde{H}\tilde{H}^H \right| \quad \text{Equation (2)}$$

where $I_s$ is the S×S identity matrix, $$\rho = \frac{P}{\sigma^2}$$

is the mean signal-to-noise ratio (SNR) per receiver branch, reduced matrix $\tilde{H}$ is created by deleting K−S rows of channel matrix H, and $S(\tilde{H})$ represents the set of all possible reduced matrices $\tilde{H}$.

Since there are $$\binom{K}{S}$$

possible reduced channel matrices $\tilde{H}$, the capacity is evaluated as many times as $$\binom{K}{S}.$$

The determinant in Equation (2) can be written as $$\left| I_s + \frac{\rho}{M} \tilde{H}\tilde{H}^H \right| = \prod_{k=1}^{r} \left(1 + \frac{\rho}{M}|\lambda_k|^2\right) \quad \text{Equation (3)}$$

where r is the rank of the reduced channel matrix $\tilde{H}$ and $\lambda_k$ is the singular value of reduced channel matrix $\tilde{H}$. The rank and the singular values are maximized for the maximum capacity.

There may be a case in which there are two rows of the channel matrix H which are identical. Clearly only one of these rows should be selected in reduced channel matrix $\tilde{H}$. Since these two rows carry the same information, either row of these two rows can be deleted without losing any information about the transmitted vector. In addition if the rows have different powers (i.e. magnitude square of the norm of the row), then the lower power row can be deleted.

When there are no identical rows then the next two rows whose correlation is the next highest are chosen for the deletion. In this manner the reduced channel matrix $\tilde{H}$ whose rows are maximally uncorrelated and have maximum powers are obtained. This leads to several methods for determining the highest correlation rate among the set of receive antennas.

A first method (method 1) for determining the highest correlation rate is performed in accordance with the formula:

$$Corr(k, l) = \left| \left\langle \frac{h_k}{\|h_k\|^2}, h_l \right\rangle \right| \quad \text{Equation (4)}$$

where X={1, 2, . . . K}, $h_k$ is the kth row of channel matrix H, $h_l$ is the lth row of channel matrix H, k≠l, and k, l∈X.

The correlation rate is determined by taking the absolute value of the inner product of the two arguments. The result is the square root of the sum of the products of each value in the h vectors.

A second method (method 2) for determining the highest correlation rate is performed in accordance with the formula:

$$Corr(k, l) = \left| \left\langle \frac{h_k}{\|h_k\|}, h_l \right\rangle \right| \quad \text{Equation (5)}$$

where X={1, 2, . . . K}, $h_k$ is the kth row of channel matrix H, $h_l$ is the lth row of channel matrix H, k≠l, and k, l∈X.

Another method (method 3) for determining the highest correlation rate is performed in accordance with the formula:

$$Corr(k, l) = \left| \left\langle \frac{h_k}{\|h_k\|}, \frac{h_l}{\|h_l\|} \right\rangle \right| \quad \text{Equation (6)}$$

where X={1, 2, . . . K}, $h_k$ is the kth row of channel matrix H, $h_l$ is the lth row of channel matrix H, k>l, and k, l∈X.

Yet another method (method 4) for determining the highest correlation rate is performed in accordance with the formula:

$$Corr(k,l)=|\langle h_k, h_l \rangle| \quad \text{Equation (7)}$$

where X={1, 2, . . . K}, $h_k$ is the kth row of channel matrix H, $h_l$ is the lth row of channel matrix H, k>l, and k, l∈X.

Method 4 is the least complex method to implement. The above methods do not require the SNR value and are based mainly on the correlation $E\{y_k y_l^+\}$ where E is the expected value of the inner product of two output vector y's average of the sum of the products of each value in y's.

As an alternative method when the SNR is available, the mutual information between received vector $Y_k$ and received vector $Y_l$ is used. The zero-valued mutual information means the received vector $Y_k$ and the received vector $Y_l$ carry totally different information. This occurs when the corresponding channel vector $h_k$ and $h_l$ are orthogonal. The channel vector $h_k$ is defined as the k-th row of the channel matrix H. If the mutual information is maximum, the received vector $y_k$ and the received vector $y_l$ carry the same information so that one of them can be deleted. The mutual information is defined as $$I(y_k;y_l)=H(y_k)+H(y_l)-H(y_k,y_l) \quad \text{Equation (8)}$$

In the MIMO system the mutual information can be written as $$I(y_k; y_l) = \log\frac{\left(\|h_k\|^2\frac{\rho}{M}+1\right)\left(\|h_l\|^2\frac{\rho}{M}+1\right)}{\left(\|h_k\|^2\frac{\rho}{M}+1\right)\left(\|h_l\|^2\frac{\rho}{M}+1\right)-|\langle h_k, h_l\rangle|^2\frac{\rho^2}{M^2}} \quad \text{Equation (9)}$$

Since the mutual information is bounded as following $$0 \leq I(y_k; y_l) \leq \min(H(y_k), H(y_l)) \quad \text{Equation (10)}$$

the normalized mutual information is defined below as $$I_0(y_k; y_l) = \frac{I(y_k; y_l)}{\min(H(y_k), H(y_l))} \quad \text{Equation (11)}$$

as a measure of how close the two random variables are. The entropy calculation of the received vector $y_k$ requires both the signal and noise power, whereas the mutual information needs the SNR only.

This can be overcome as follows. The scaling of receive vector $y_k$ to $c \cdot y_k$, where the non-zero real number c is chosen in the way that the noise variance is equal to one, will not normalize mutual information. The scaling does not change the mutual information while the entropy of $c \cdot y_k$ becomes $$H(c-y_k) = \log\left(c^2\|h_k\|^2\frac{P}{M} + c^2\sigma^2\right) = \log\left(\|h_k\|^2\frac{\rho}{M} + 1\right) \quad \text{Equation (12)}$$

The normalized mutual information is redefined as $$I_0(y_k; y_l) = \frac{I(c \cdot y_k; c \cdot y_l)}{\min(H(c \cdot y_k), H(c \cdot y_l))} \quad \text{Equation (13)}$$

Then, the normalized mutual information becomes $$I_0(y_k; y_l) = \frac{I(y_k; y_l)}{\min\left(\log\left(\|h_k\|^2\frac{\rho}{M}+1\right), \log\left(\|h_l\|^2\frac{\rho}{M}+1\right)\right)} \quad \text{Equation (14)}$$

The procedure for calculating the normalized mutual information (method 5) is done in accordance with the formula:

$$I_0(y_k; y_l) \quad \text{Equation (15)}$$

where $X = \{1, 2, \ldots K\}$, k>l, and k, l$\in$X.

The mutual information based technique can also be applied to the data component $x_k$ in order to avoid requiring the SNR value. Then, the mutual information between the data component $x_k$ and the data component $x_l$ is $$I(x_k; x_l) = \log\frac{\|h_k\|^2\|h_l\|^2}{\|h_k\|\|h_l\|^2 - |\langle h_k, h_l\rangle|^2}. \quad \text{Equation (16)}$$

Similarly, the normalized mutual information is defined below as $$I_0(x_k; x_l) = \quad \text{Equation (17)}$$

$$\frac{I(c \cdot x_k; c \cdot x_l)}{\min(H(c \cdot x_k), H(c \cdot x_l))} = \frac{I(x_k; x_l)}{\min(\log\|h_k\|^2, \log\|h_l\|^2)}$$

The procedure for calculating the normalized mutual information (method 6) is done in accordance with the formula:

$$I_0(x_k, x_l) \quad \text{Equation (18)}$$

where $X = \{1, 2, \ldots K\}$, k>l, and k, l$\in$X.

Having described receiver antenna selection techniques with respect to MIMO systems, the following describes receiver selection techniques with respect to MIMO OFDM systems.

In a MIMO OFDM system with N subcarriers, the channel matrix under time invariant channel can be modeled as a block diagonal matrix $$H = \begin{bmatrix} H(1) & 0 & \cdots & 0 \\ 0 & H(2) & 0 & \vdots \\ \vdots & 0 & \ddots & 0 \\ 0 & \cdots & 0 & H(N) \end{bmatrix} \quad \text{Equation (19)}$$

where $$H(n) = \begin{bmatrix} H_{11(n)} & H_{12(n)} & \cdots & H_{1M}(n) \\ H_{21}(n) & H_{22}(n) & \cdots & H_{2M}(n) \\ \vdots & \vdots & \ddots & \vdots \\ H_{K1(n)} & H_{K2(n)} & \cdots & H_{KM}(n) \end{bmatrix}$$

represents the channel matrix between K receive and M transmit antennas at subcarrier n. The capacity becomes $$C = \sum_{n=1}^{N} \log_2\left|I_K + \frac{\rho}{M}H(n)H^H(n)\right|. \quad \text{Equation (20)}$$

In the correlation based methods (methods 1-4 described above for a MIMO system) the correlation must now be averaged over the subcarriers to provide the same function for a MIMO OFDM system. For example, the correlation formula used in method 1 for a MIMO system is modified to account for the subcarriers to become method 7 which is performed in accordance with the formula:

$$Corr(k,l) = \left|\sum_{n=1}^{N}\left\langle\frac{h_k(n)}{\|h_k(n)\|^2}, h_l(n)\right\rangle\right| \quad \text{Equation (21)}$$

where $X = \{1, 2, \ldots K\}$, $h_k(n)$ is the kth row of channel matrix at subcarrier n H(n), k$\neq$l, and k, l$\in$X.

Similarly, the correlation formula used in method 2 for a MIMO system is modified to become method 8 for a MIMO OFDM system, which is performed in accordance with the formula:

$$Corr(k,l) = \left| \sum_{n=1}^{N} \left\langle \frac{h_k(n)}{\|h_k(n)\|}, h_l(n) \right\rangle \right|$$ Equation (22)

where $X=\{1, 2, \ldots K\}$, $h_k(n)$ is the kth row of channel matrix at subcarrier n H(n), $k \neq l$, and k, $l \in X$.

The correlation formula used in method 3 for a MIM system is replaced with method 9 for a MIMO OFDM system, which is performed in accordance with the formula:

$$Corr(k,l) = \left| \sum_{n=1}^{N} \left\langle \frac{h_k(n)}{\|h_k(n)\|}, \frac{h_l(n)}{\|h_l(n)\|} \right\rangle \right|$$ Equation (23)

where $X=\{1, 2, \ldots K\}$, $h_k(n)$ is the kth row of channel matrix at subcarrier n H(n), $k \neq l$, and k, l$\in X$.

The correlation formula used in method 4 for a MIMO system is replaced with method 10 for a MIMO OFDM system, which is performed in accordance with the formula:

$$Corr(k, l) = \left| \sum_{n=1}^{N} \langle h_k(n), h_l(n) \rangle \right|$$ Equation (24)

where $X=\{1, 2, \ldots K\}$, $h_k(n)$ is the kth row of channel matrix at subcarrier n H(n), $k \neq l$, and k, $l \in X$.

Defining the received vector at the k-th receive antenna as $y_k=[y_k(1)\ y_k(2) \ldots y_k(N)]^T$ where $y_k(n)$ is the k-th receive antenna output at the n-th subcarrier, the mutual information in the MIMO OFDM system becomes $$I(y_k; y_l) = H(y_k) - H(y_k, y_l)$$ Equation (25)

The block diagonal property of the MIMO OFDM channel matrix defines the mutual information to be $$I(y_k; y_l) = \sum_{n=1}^{N} H(y_k(n)) + H(y_l(n)) - H(y_k(n), y_l(n))$$ Equation (26)

Hence, the mutual information-based techniques used in the MIMO systems are modified to use the following normalized mutual information and to take into account the subcarrier n. Method 5 for a MIMO system is replaced by method 11 for a MIMO OFDM system wherein:

$$I_0(y_k; y_l) = \frac{\sum_n I(y_k(n); y_l(n))}{\min\left(\sum_n H(c \cdot y_k(n)), \sum_n H(c \cdot y_l(n))\right)}$$ Equation 27 where $y_k$ is the k-th receive vector at subcarrier n, $y_l$ is the l-th receive vector at subcarrier n, c is a constant, H is a channel matrix, k>l, and k, $l \in X$.

Similarly, method 6 for a MIMO system is replaced by method 12 for a MIMO OFDM system which is performed in accordance with the formula:

$$I_0(x_k; x_l) = \frac{\sum_n I(x_k(n); x_l(n))}{\min\left(\sum_n H(c \cdot x_k(n)), \sum_n H(c \cdot x_l(n))\right)}$$ Equation 28 where $y_k$ is the k-th receive vector at subcarrier n, $y_l$ is the l-th receive vector at subcarrier n, c is a constant, H is a channel matrix, k>l, and k, $l \in X$.

Figure 2:
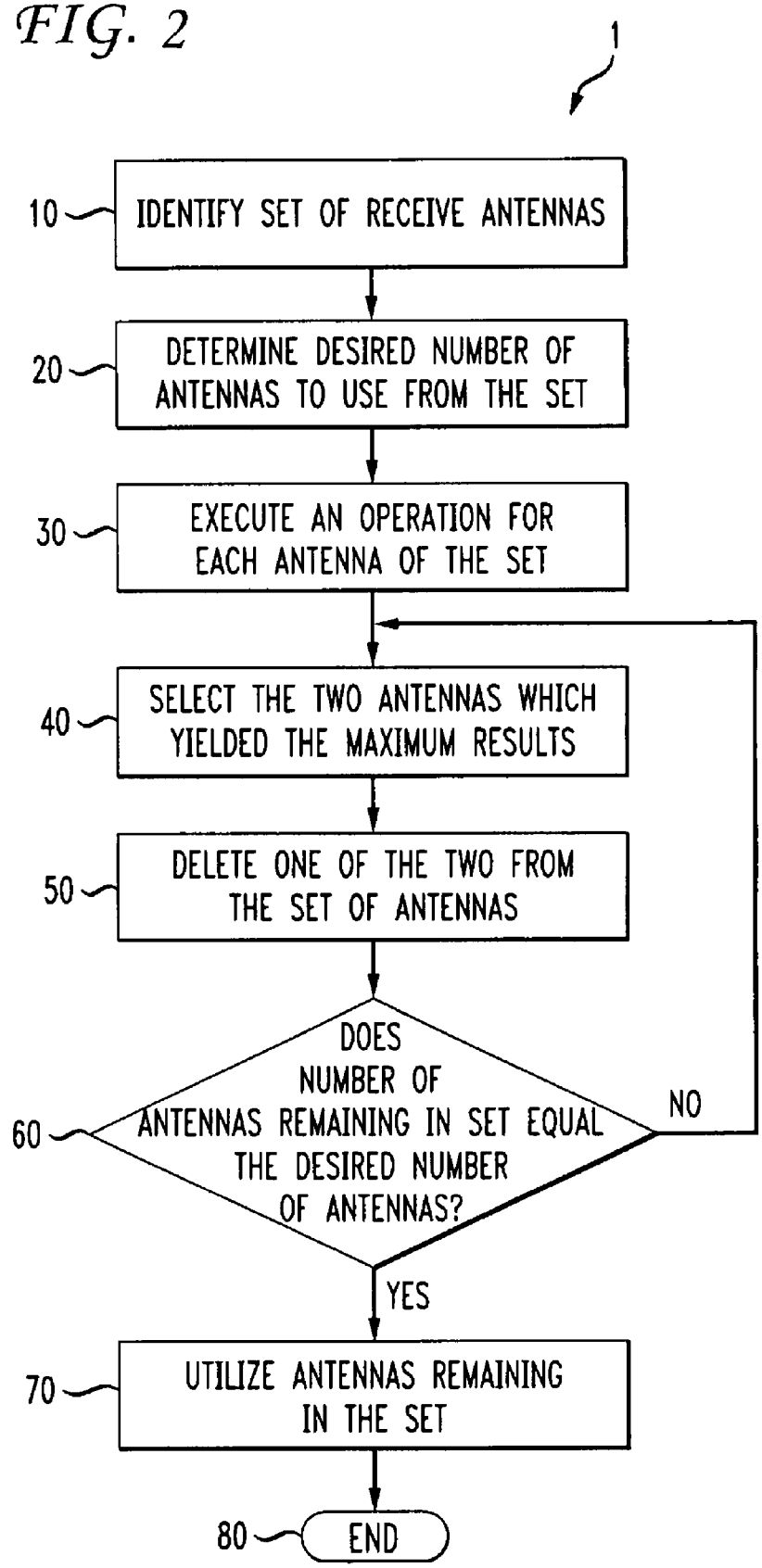
FIG. 2 is a flow chart of the present method.

Referring now to FIG. 2, a flow chart of the presently disclosed method is depicted. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present to invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

The process starts at step 10 wherein a set of receive antennas of a MIMO or MIMO OFDM receiver are identified. In the present example, the set of receive antennas comprise six antennas referred to as antenna 1-antenna 6 respectively. While a set of six receive antennas are used in this example, it should be appreciated that any number of, receive antennas could be used.

The process then proceeds to step 20 where a determination is made as to the number of antennas to be used. For example, if the MIMO or MIMO OFDM receiver has a set of six receive antennas, it may be desirable to only process signals from two of the six antennas. While only two of six receive antennas are used in this example, it should be appreciated that any number of receive antennas could be used.

At step 30 an operation is executed for each antenna of the set of receive antennas. The operation may relate to determining the amount of correlation between each antenna which each other antenna of the set, or determining an amount of mutual information between antennas of the set.

At step 40 the two antennas which yielded the maximum results of the operation performed in step 30 are selected. In the present example, if a correlation operation was performed and it turned out that antennas 4 and 6 were the most closely correlated pair, than these two antennas are selected.

Following step 40, step 50 is executed wherein one of the two antennas (antenna 4, antenna 6) is deleted from the set of receive antennas. Therefore, either antenna 4 or antenna 6 is deleted from the set of receive antennas. Thus, initially the set of receive antennas included antennas 1-6, and antenna 4 is deleted, leaving five remaining antennas in the set of receive antennas (antennas 1-3 and 5-6).

At step 60 a determination is made as to whether the remaining set of antennas has the desired number of antennas left in the set. In this instance five antennas are remaining, while it is desired to have only two remaining, so steps 40 and 50 are executed again. Each iteration of steps 40 and 50 result in another antenna being removed from the set of receive antennas. Steps 40 and 50 are repeated until there are only two antennas remaining in the set of receive antennas. Once the desired number of antennas is left in the set of receive antennas, step 70 is executed.

At step 70, the antennas remaining in the set of receive antennas are used, and signals from these antennas are processed. The method then ends at step 80.

Figure 3:
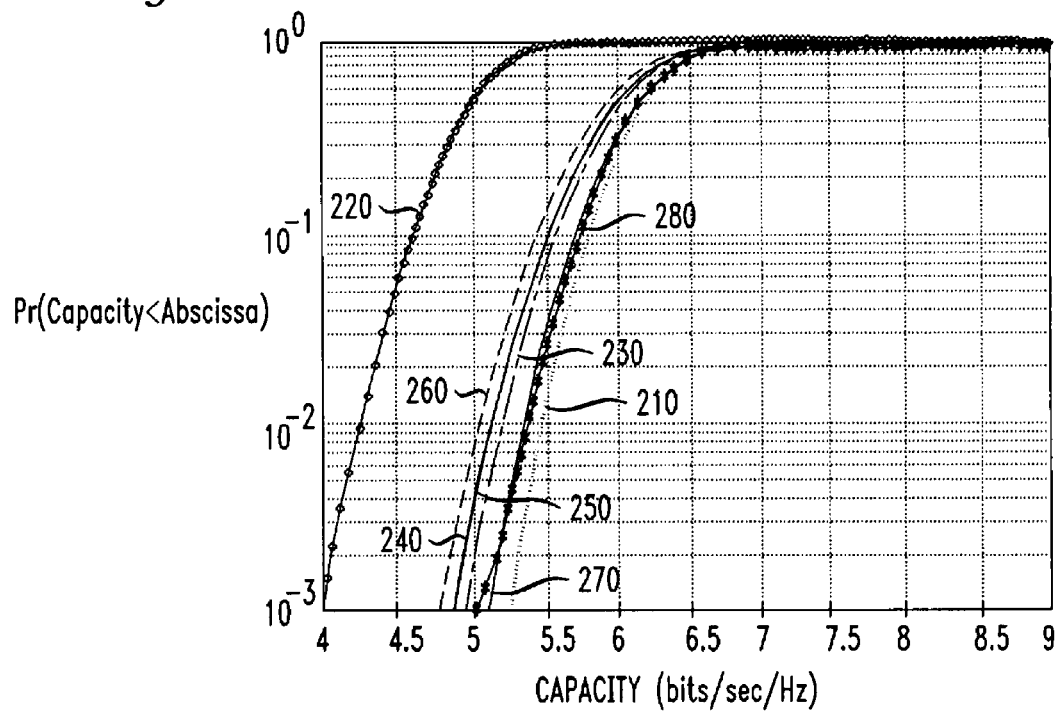
FIG. 3 is a graph of outage probability in a MIMO OFDM with an SNR of 10 db.
Figure 4:
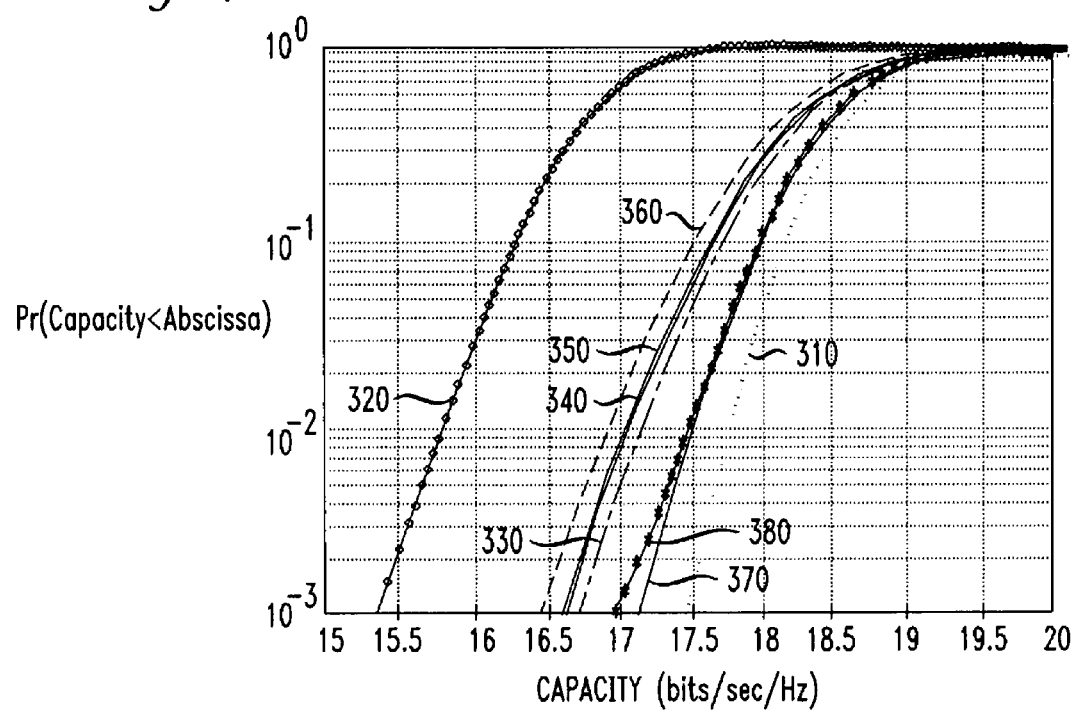
FIG. 4 is a graph of outage probability in a MIMO OFDM with an SNR of 30 db.

Referring now to FIGS. 3 and 4, the outage probability of each disclosed method in a MIMO OFDM system under frequency selective Rayleigh fading channel is shown. The number of subcarriers is 64. The maximum delay spread ($T_d$) is ¼ of the symbol duration and the r.m.s. delay spread ($\tau_d$) is assumed to be ¼ of the maximum delay spread with an exponential power distribution. The number of transmit and receive antennas is 2 and 6, respectively. FIG. 3 uses an SNR of 10 db, while FIG. 4 uses a SNR value of 30 db. Each method selects 2 out of 6 receive antennas. For FIG. 3, the best selection is shown by line 210, and the worst selection is shown by line 220. The selection using methods 7-12 are shown by lines 230, 240, 250, 260, 270 and 280 respectively. For FIG. 4, the best selection is shown by line 310, and the worst selection is shown by line 320. The selection using methods 7-12 are shown by lines 330, 340, 350, 360, 370 and 380 respectively. Among fast methods the mutual information based methods (methods 11 and 12) outperform the correlation-based methods (methods 7-10).

Figure 5:
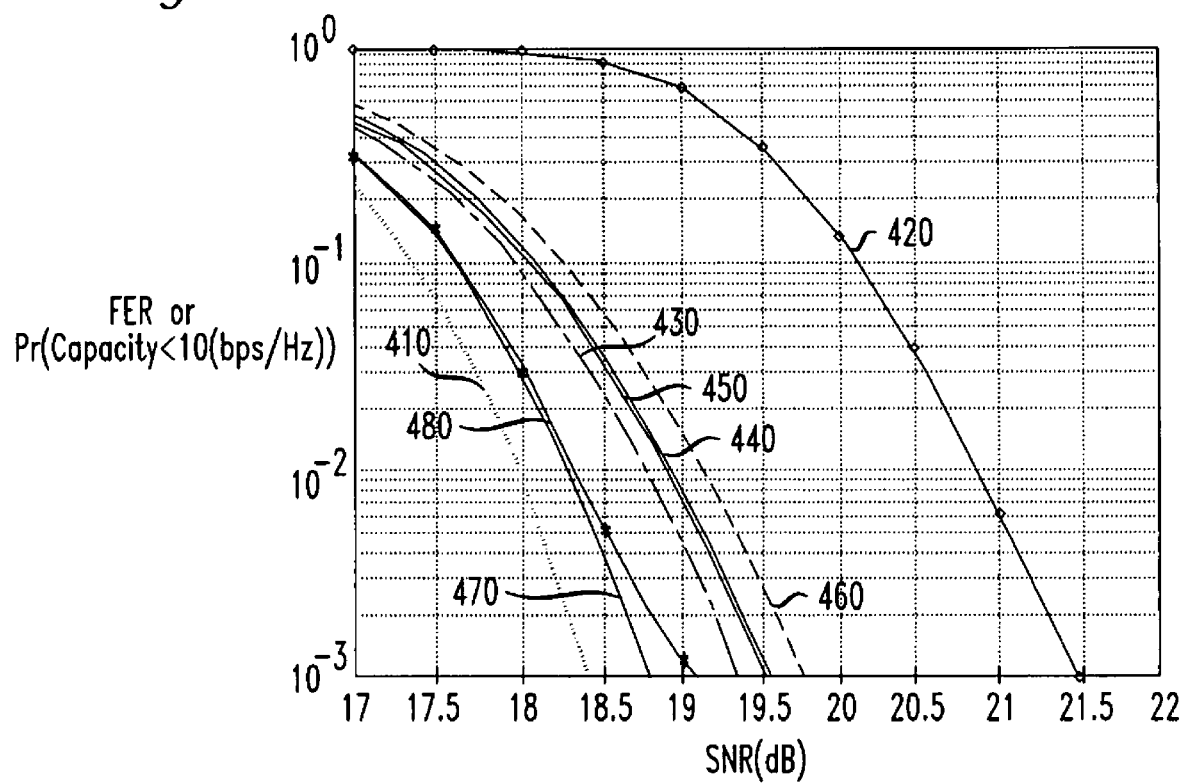
FIG. 5 is a graph of frame error rate (FER) in a MIMO OFDM.

The FER (frame error rate) is shown in FIG. 5 when the bandwidth efficiency is 10 bits/sec/Hz. The worst selection has 3 dB loss at $10e^{-3}$ FER. Method 11 (line 470) has less than 0.5 dB loss while the correlation based methods (methods 7-10, designated by lines 430, 440, 450 and 460 respectively) exhibit from 1 to 1.5 dB loss. The performance of the fast method 12 (line 480) is comparable to or even better than that of the method 11 (line 470) at high FER while at low FER the method 12 (line 480) has similar performance with the correlation based methods (not shown). Method 12 (line 480) has good performance overall while it does not require the SNR value as in the correlation based methods.

A method of performing receive antenna selection for MIMO and MIMO OFDM systems has been described. The method executes a determination operation for a set of receive antennas, determines a maximum result of the determination operation for two of the antennas, as, eliminates one of the two antennas from the set of antennas, and repeats the determination and elimination process until only a predetermined number of antennas remain in the set. The signals from these remaining antennas are then processed. The present invention reduces receiver complexity and cost.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A non-transitory computer readable medium comprising computer program instructions capable of being executed in a processor and defining the steps comprising:
   executing a determination operation for each antenna of a set of antennas comprising executing a correlation operation for a MIMO system according to the formula:

$$Corr(k, l) = \left| \left\langle \frac{h_k}{\|h_k\|^2}, h_l \right\rangle \right|$$

where X={1, 2 ... K}, $h_k$ is the kth row of channel matrix H, $h_l$ is the lth row of channel matrix H, k≠l, and k, l∈X;
   deleting at least one of said antennas from said set of antennas based on said determination operation; and
   performing said deleting until the number of antennas remaining in said set of antennas equals a desired number of antennas.

2. A non-transitory computer readable medium comprising computer program instructions capable of being executed in a processor and defining the steps comprising:
   executing a determination operation for each antenna of a set of antennas comprising executing a correlation operation for a MIMO system according to the formula:

$$Corr(k, l) = \left| \left\langle \frac{h_k}{\|h_k\|}, h_l \right\rangle \right|$$

where X={1, 2 ... K}, $h_k$ is the kth row of channel matrix H, $h_l$ is the lth row of channel matrix H, k≠l, and k, l∈X;
   deleting at least one of said antennas from said set of antennas based on said determination operation; and
   performing said deleting until the number of antennas remaining in said set of antennas equals a desired number of antennas.

3. A non-transitory computer readable medium comprising computer program instructions capable of being executed in a processor and defining the steps comprising:
   executing a determination operation for each antenna of a set of antennas comprising executing a correlation operation for a MIMO system according to the formula:

$$Corr(k, l) = \left| \left\langle \frac{h_k}{\|h_k\|}, \frac{h_l}{\|h_l\|} \right\rangle \right|$$

where X={1, 2 ... K}, $h_k$ is the kth row of channel matrix H, $h_l$ is the lth row of channel matrix H, k>l and k, l∈X;
   deleting at least one of said antennas from said set of antennas based on said determination operation; and
   performing said deleting until the number of antennas remaining in said set of antennas equals a desired number of antennas.

4. A non-transitory computer readable medium comprising computer program instructions capable of being executed in a processor and defining the steps comprising:
   executing a determination operation for each antenna of a set of antennas comprising executing a correlation operation for a MIMO system according to the formula:

$$Corr(k, l) = |\langle h_k, h_l \rangle|$$

where $X=\{1, 2, \ldots K\}$, $h_k$ is the kth row of channel matrix H, $h_l$ is the lth row of channel matrix H, k>l, and k, l∈X;

deleting at least one of said antennas from said set of antennas based on said determination operation; and performing said deleting until the number of antennas remaining in said set of antennas equals a desired number of antennas.

5. A non-transitory computer readable medium comprising computer program instructions capable of being executed in a processor and defining the steps comprising:

determining a set of receive antennas;

determining a desired number of antennas to be selected from said set of antennas;

executing a determination operation for each antenna of said set of receive antennas;

selecting two of said antennas which yielded a maximum determination operation result;

deleting one of said two antennas which yielded a maximum determination operation result from said set of receive antennas;

performing said selecting and said deleting until the number of antennas remaining in said set of receive antennas equals the desired number of receive antennas; and processing signals from said antennas remaining in said set of receive antennas having the desired number of receive antennas.

6. The computer readable medium of claim 5 wherein the step of executing a determination operation comprises executing a correlation operation for a MIMO system.

7. The computer readable medium of claim 6 wherein the step of executing a correlation operation is performed according to the formula:

$$Corr(k, l) = \left| \left\langle \frac{h_k}{\|h_k\|^2}, h_l \right\rangle \right|$$

where $X=\{1, 2 \ldots K\}$, $h_k$ is the kth row of channel matrix H, $h_l$ is the lth row of channel matrix H, k≠l, and k, l∈X.

8. The computer readable medium of claim 6 wherein the step of executing a correlation operation is performed according to the formula:

$$Corr(k, l) = \left| \left\langle \frac{h_k}{\|h_k\|}, h_l \right\rangle \right|$$

where $X=\{1, 2 \ldots K\}$, $h_k$ is the kth row of channel matrix H, $h_l$ is the lth row of channel matrix H, k≠l, and k, l∈X.

9. The computer readable medium of claim 6 wherein the step of executing a correlation operation is performed according to the formula:

$$Corr(k, l) = \left| \left\langle \frac{h_k}{\|h_k\|}, \frac{h_l}{\|h_l\|} \right\rangle \right|$$

where $X=\{1, 2 \ldots K\}$, $h_k$ is the kth row of channel matrix H, $h_l$ is the lth row of channel matrix H, k>l and k, l∈X.

10. The computer readable medium of claim 6 wherein the step of executing a correlation operation is performed according to the formula:

$$Corr(k,l) = |\langle h_k, h_l \rangle|$$

where $X=1, 2, \ldots K$, $h_k$ is the kth row of channel matrix H, $h_l$ is the lth row of channel matrix H, k>l, and k, l∈X.

11. The computer readable medium of claim 6 wherein said deleting one of said two antennas comprises computer program instructions defining the step of deleting the one having the smallest power.

12. The computer readable medium of claim 5 wherein the step of executing a determination operation comprises computer program instructions defining the step of executing a mutual information determination operation for a MIMO system.

13. The computer readable medium of claim 12 wherein said executing a mutual information determination operation is performed according to the formula:

$$I_o(y_k; y_l)$$

where $X=\{1, 2 \ldots K\}$, k>l, and k, l∈X.

14. The computer readable medium of claim 12 wherein said executing a mutual information determination operation is performed according to the formula:

$$I_o(x_k; x_l)$$

where $X=\{1, 2 \ldots K\}$, k>l, and k, l∈X.

15. The computer readable medium of claim 12 wherein said deleting one of said two antennas comprises deleting the one having the smallest entropy.

16. The computer readable medium of claim 5 wherein said executing a determination operation comprises executing a correlation operation for a MIMO OFDM system.

17. The computer readable medium of claim 16 wherein said executing a correlation operation is performed according to the formula:

$$Corr(k.l) = \left| \sum_{n=1}^{N} \left\langle \frac{h_k(n)}{\|h_k(n)\|^2}, h_l(n) \right\rangle \right|$$

where $X=\{1, 2, \ldots K\}$, $h_k(n)$ is the kth row of H(n), k≠l, and k, l∈X.

18. The computer readable medium of claim 16 wherein said executing a correlation operation is performed according to the formula:

$$Corr(k.l) = \left| \sum_{n=1}^{N} \left\langle \frac{h_k(n)}{\|h_k(n)\|}, h_l(n) \right\rangle \right|$$

where $X=\{1, 2, \ldots K\}$, $h_k(n)$ is the kth row of channel matrix at subcarrier n H(n), k≠l, and k, l∈X.

19. The computer readable medium of claim 16 wherein said executing a correlation operation is performed according to the formula $$Corr(k.l) = \left| \sum_{n=1}^{N} \left\langle \frac{h_k(n)}{\|h_k(n)\|}, \frac{h_l(n)}{\|h_l(n)\|} \right\rangle \right|$$

where $X=\{1, 2, \ldots K\}$, $h_k(n)$ is the kth row of channel matrix at subcarrier n H(n), k≠l, and k, l∈X.

20. The computer readable medium of claim 16 wherein said executing a correlation operation is performed in accordance with the formula:

$$Corr(k.l) = \left| \sum_{n=1}^{N} \langle h_k(n), h_l(n) \rangle \right|$$

where $X=\{1, 2, \ldots K\}$, $h_k(n)$ is the kth row of channel matrix at subcarrier n $H(n)$, $k \neq l$, and k, $l \in X$.

21. The computer readable medium of claim 5 wherein said executing a determination operation comprises executing a mutual information determination operation for a MIMO OFDM system.

22. The computer readable medium of claim 21 wherein said executing a mutual information determination operation is performed according to the formula:

$$I_0(y_k; y_l) = \frac{\sum_n I(y_k(n); y_l(n))}{\min\left(\sum_n H(c \cdot y_k(n)), \sum_n H(c \cdot y_l(n))\right)}$$

where $y_k$ is the k-th receive vector at subcarrier n, $y_l$ is the l-th receive vector at subcarrier n, c is a constant, H is a channel matrix, k>l and k, $l \in X$.

23. The computer readable medium of claim 21 wherein said executing a mutual information determination operation is performed according to the formula:

$$I_0(x_k; x_l) = \frac{\sum_n I(x_k(n); x_l(n))}{\min\left(\sum_n H(c \cdot x_k(n)), \sum_n H(c \cdot x_l(n))\right)}$$

where $y_k$ is the k-th receive vector at subcarrier n, $y_l$ is the l-th receive vector at subcarrier n, c is a constant, H is a channel matrix, k>l, and k, $l \in X$.

* * * * *